United States Patent [19]

Yamazaki et al.

[11] Patent Number: 4,653,846
[45] Date of Patent: Mar. 31, 1987

[54] OPTICAL FIBER HERMETIC FIXING STRUCTURE OF FEEDTHROUGH FOR OPTICAL SUBMARINE REPEATER

[75] Inventors: Yoshihiko Yamazaki, Yokohama; Yoshihiro Ejiri, Tokyo; Kahei Furusawa, Kamifukuoka, all of Japan

[73] Assignee: Kokusai Denshin Denwa Kabushiki Kaisha, Tokyo, Japan

[21] Appl. No.: 594,363

[22] Filed: Mar. 28, 1984

[30] Foreign Application Priority Data

Mar. 28, 1983 [JP] Japan .................. 58-50466

[51] Int. Cl.⁴ .............................. G02B 6/36
[52] U.S. Cl. ................ 350/96.20; 350/96.23; 174/70 S
[58] Field of Search ............ 350/96.20, 96.23; 174/70 S

[56] References Cited

U.S. PATENT DOCUMENTS

| | | | |
|---|---|---|---|
| 4,166,672 | 9/1979 | Gilbert | 350/96.20 |
| 4,330,171 | 5/1982 | Malsot et al. | 350/96.20 X |
| 4,345,816 | 8/1982 | Nakai et al. | 350/96.20 |
| 4,487,474 | 12/1984 | Nishie et al. | 350/96.20 X |

FOREIGN PATENT DOCUMENTS 0083703 7/1981 Japan .................. 350/96.20
0114913 9/1981 Japan .................. 350/96.20

*Primary Examiner*—William L. Sikes
*Assistant Examiner*—Akm E. Ullah
*Attorney, Agent, or Firm*—Robert E. Burns; Emmanuel J. Lobato; Bruce L. Adams

[57] ABSTRACT

An optical fiber hermetic fixing structure of a feedthrough for an optical submarine repeater in which at least one optical fiber is introduced into a fluid-tight pressure-resistant housing of an optical marine repeater. Optical fibers are introduced and disposed in a through opening defined between a metal fiber-supporting guide and a metal sealing sleeve circumferentially of the fiber-supporting guide. The guide has a somewhat reduced diameter adjacent an end of the through opening so that the through opening has a greater transverse dimension along this part adjacent a seawater end of the feedthrough. This part of the through opening is filled with a low temperature melting metal about and between the optical fibers extending therethrough. The low melting temperature metal extends out of the through opening with a generally conical cross section configuration. A protective cover cap is disposed coaxial with the sleeve and fiber-supporting guide and through which the optical fibers extend longitudinally. The protective cover cap is filled with a liquid filler.

16 Claims, 16 Drawing Figures

*Fig. 1* PRIOR ART
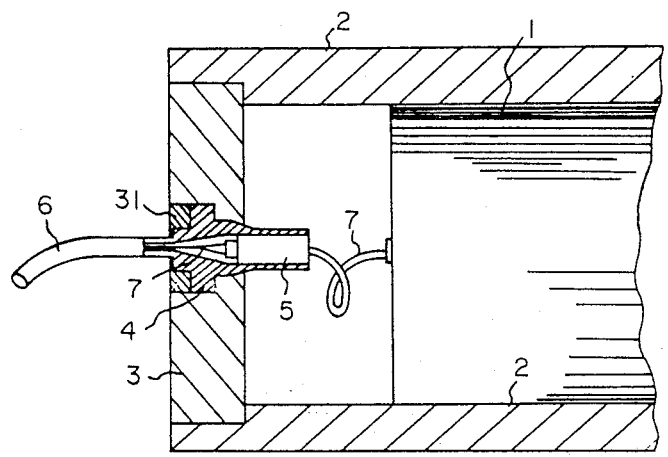
*Fig. 2A* PRIOR ART
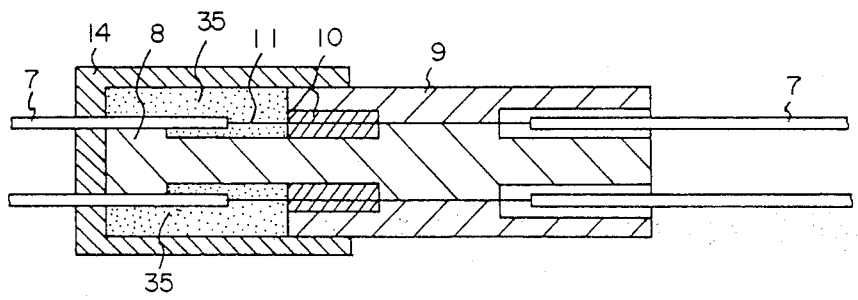
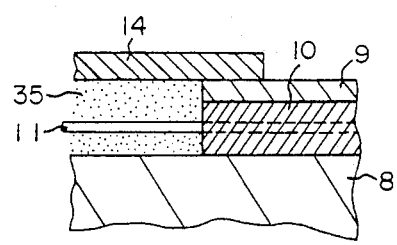
*Fig. 2B*

OPTICAL FIBER HERMETIC FIXING STRUCTURE OF FEEDTHROUGH FOR OPTICAL SUBMARINE REPEATER

BACKGROUND OF THE INVENTION

The present invention relates to a feedthrough for an optical fiber or fibers provided in an optical submarine cable repeater.

An optical submarine cable using optical fibers is laid on the bottom of the sea sometimes as deep as several thousand meters, and hence is exposed to a hydraulic pressure of several hundred atmospheres. A repeater housing for use under such severe conditions is made of material which is highly resistant to corrosion by sea water, such as stainless steel, beryllium copper alloy or the like. The optical fiber is introduced, through a feedthrough mounted on an end plate of the pressure-tight repeater housing, into optical repeater circuitry housed in the repeater housing. Accordingly, in order to introduce the optical fiber and a power-supplying feeder into the pressure-tight repeater housing under the hydraulic pressure of several hundred atmospheres, a highly reliable feedthrough is required which is sufficiently sturdy to withstand such high hydraulic pressures, fully insulated electrically from sea water, air-tight and stably usable for a long period of time.

As described above, the most important problems of the long-distance optical submarine cable system are to maintain its life time of more than 20 years and to definitely establish a method for guaranteeing the long-term reliability. The submarine cable system potentials cannot be realized unless its reliability is guaranteed.

SUMMARY OF THE INVENTION

An object of the present invention is to provide an optical fiber hermetically fixing structure of a feedthrough for an optical submarine repeater which secures the abovesaid long-term reliability with much ease.

In accordance with the present invention, there is provided an optical fiber hermetic fixing structure of a feedthrough for an optical submarine repeater in which at least one optical fiber is introduced into a pressure-tight housing of an optical submarine repeater, characterized in that the optical fiber is introduced and disposed in a fiber receiving through opening formed between a fiber-supporting guide and a sealing sleeve disposed over the fiber guide. The fiber receiving through opening has at one end a groove formed between the fiber guide and the sealing sleeve. A low temperature melting metal is filled in between a clad or thin primary coating of each optical fiber, or a metal coating thereon and the groove. The low temperature melting metal is filled at the seawater side of the sleeve and the fiber-supporting guide in such a manner as to swell around each fiber from an end portion of the groove. A liquid filler is filled around the filled portion of the low temperature melting metal filled at the seawater side of the sleeve and the fiber-supporting guide in such a manner as to swell around each fiber from an end portion of the groove. A liquid filler is filled around the filled portion of the low temperature melting metal and the fiber; and a fiber-protecting cap is provided around the liquid filler.

A fiber support post projects from the fiber-supporting guide to the outside of the filled portion of the low temperature melting metal; and the fiber-support post is covered with a Teflon, or the like, heat-proof plastic layer.

The fiber-supporting guide, the sealing sleeve and the fiber-support post are made of metal of a small thermal expansion coefficient, such as Kovar.

An optical fiber-protecting cap is movably sealed between it and the sealing sleeve by means of an "O" ring or the like, or takes the form of bellows.

The optical fiber protecting cap is made of plastic or rubber, and is merely engaged with the sealing sleeve.

The optical fiber-protecting cap is provided with a piston cap of movable type.

BRIEF DESCRIPTION OF THE DRAWINGS

The present invention will be described in detail below in comparison with conventional art with reference to the accompanying drawings, in which:

FIG. 1 is a longitudinal section showing the construction of a known optical submarine repeater;

FIGS. 2A, 2B and 3 are longitudinal sections showing optical fiber hermetic fixture parts of a feedthrough previously proposed;

DESCRIPTION OF THE PREFERRED EMBODIMENTS

Figure 3:
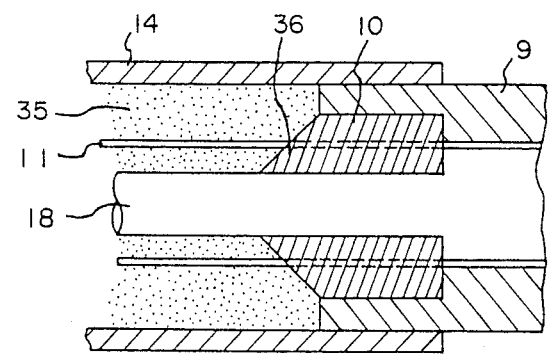

To meet with the above mentioned requirements of the conventional art, there has been developed a feedthrough structure in which a metallic cover wrapped around the optical fiber is hermetically fixed to an end plate of the housing through use of a low temperature melting metal such as solder or the like. FIG. 1 is a cross-section showing the principal part of an optical submarine repeater. A repeater unit 1 for amplifying an optical signal is protected from the high hydraulic pressure, by a pressure-tight cylinder 2 covering the unit 1 and a cover 3. The optical signal is transmitted over an optical fiber 7. Mounted in the cover 3 at its terminal attachment portion 31 is a feedthrough 4, which is connected to an optical submarine cable 6. The Optical fiber 7 is connected to the optical submarine cable 6 through a hermetically fixing portion 5 provided in the feedthrough 4.

FIG. 2A is a section showing the structure of the hermetically fixing portion 5. The optical fiber 7 has its cover partly removed and instead given a metal coating 11, and it is hermetically fixed by a metal sleeve 9 and solder at a solder sealing portion 10. Reference numeral 8 indicates a fiber support, and 14 a protecting cap. A space between the cap 14 and the solder sealing portion 10 is filled with an adhesive resin 35. FIG. 2B shows, on an enlarged scale, the solder sealing portion, in which solder is filled up to the same position as the end face of the metal sleeve 9.

With such a feedthrough, when a hydraulic pressure is applied thereto in a case of a cable fault, the water-tightness and air-tightness are provided by the adhesion between the metal coating of the fiber and the adhesive binder and between the metal coating and the solder, or by a stress clamping the fiber which results from cooling shrinkage of the thermally applied solder. The adhesive binder is permeable to water and hence produces no air-tight effect, so that the air-tightness of the solder sealing portion alone is expected. However, the adhesion and the clamping stress for obtaining the air-tightness do not stably act for a long period of time. It is generally known that the internal stress of the solder is released or relieved with the lapse of time, and it is a physical characteristic of the solder that its adherency also decreases with time. Accordingly, in case of using such a feedthrough in an optical submarine repeater housing, it is a very important problem how its long-term reliability over 20 years is guaranteed, and a method therefor has not definitely been established as yet.

Further, the adhesive binder 35 filled as mentioned above adheres to the fiber support 8 and the cap 14, so that when the feedthrough 4 is subject to pressure and temperature changes, the optical fiber 7 is exposed to all stress distortion and heat distortion of the adhesive binder 35 and the cap 14. In consequence, the optical fiber 7 is greatly distorted, introducing the possibility of incurring an increased loss or impairing the long-term reliability of the fiber owing to its breakage or the like.

FIG. 3 also shows an example of a solder sealing structure heretofore employed. In this example, the metalcoated optical fiber 11 is sealed by solder which is filled conically around a fiber support post 18, swelling from the solder sealing portion 10. In this case, a pressure exerted on the solder sealing portion 10 is not uniformly applied to the fiber, regardless of whether the adhesive binder 35 is used or not. Accordingly, with such a structure, the reliability of its air- and water-tightness is still dependent only upon the adherency between the fiber and the solder and the stress of the solder due to its thermal shrinkage, as is the case with the structure of FIG. 2, so that the desired long-term reliability cannot be guaranteed.

The present invention will hereinafter be described in detail.

The present invention utilizes the self-sealing effect of solder with respect to the fiber when a pressure is applied thereto, and provides stable water- and air-tightness without regard to the adherency between the fiber and the solder and to the shrinking force of the thermally applied solder.

Figure 4A:
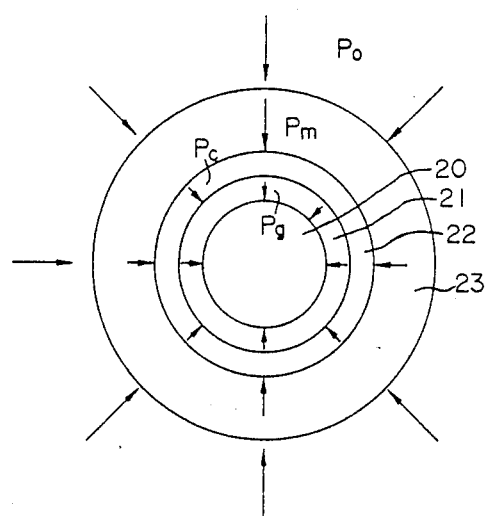
FIGS. 4A and 4B are a cross-section and a longitudinal section of a fiber covered with solder.
Figure 4B:
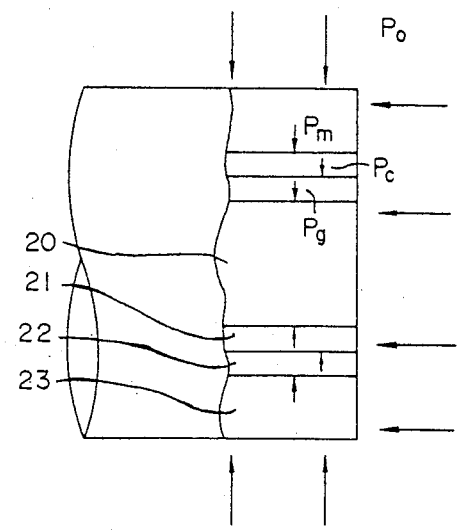

A description will be given first of this principle. FIGS. 4A and 4B show, in section, a case in which a metal coating 22 is wrapped around a primary coatiing 21 of a fiber 20 and is covered with solder 23. FIG. 4A shows its section in its radial direction, and FIG. 4B its section in its axial direction. In a case where an external pressure $P_o$ is uniformly applied to such a fiber from the outside of the solder 23, an internal stress $P_m$ applied to the outer periphery of the metal coating 22, an internal stress $P_c$ applied to the outer periphery of the primary coating 21 and an internal stress $P_g$ applied to the outer periphery of the fiber glass 20 can be calculated by the following equations, respectively:

$$P_m = \frac{\frac{2R_4^2}{E_4(R_4^2 - R_3^2)}}{\frac{1}{E_m}(1 - \nu_m) + \frac{1}{E_4}\left(\frac{R_4^2 + R_3^2}{R_4^2 - R_3^2} + \nu_4\right)} \cdot P_o \quad (1)$$

$$P_c = \frac{\frac{2R_3^2}{E_3(R_3^2 - R_2^2)}}{\frac{1}{E_c}(1 - \nu_c) + \frac{1}{E_3}\left(\frac{R_3^2 + R_2^2}{R_3^2 - R_2^2} + \nu_3\right)} \cdot P_m \quad (2)$$

$$P_g = \frac{\frac{2R_2^2}{E_2(R_2^2 - R_1^2)}}{\frac{1}{E_1}(1 - \nu_1) + \frac{1}{E_2}\left(\frac{R_2^2 + R_1^2}{R_2^2 + R_1^2} + \nu_2\right)} \cdot P_c \quad (3)$$

where
$E_1$ . . . the Young's modulus of the glass;
$\nu_1$ . . . the Poisson's ratio of the glass;
$E_2$ . . . the Young's modulus of the primary coating;
$\nu_2$ . . . the Poisson's ratio of the primary coating;
$E_3$ . . . the Young's modulus of the metal coating;
$\nu_3$ . . . the Poisson's ratio of the metal coating;
$E_4$ . . . the Young's modulus of the solder;
$\nu_4$ . . . the Poisson's ratio of the solder;
$R_1$ . . . the radius of the glass;
$R_2$ . . . the radius up to the primary coating;
$R_3$ . . . the radius up to the metal coating;
$R_4$ . . . the radius up to the solder;
$E_m$ . . . the equivalent Young's modulus up to the metal coating surface;
$\nu_m$ . . . the equivalent Poisson's ratio up to the metal coating surface;
$E_c$ . . . the equivalent Young's modulus up to the primary coating;
$\nu_c$ . . . the equivalent Poisson's ratio up to the primary coating;

$$E_m = \frac{E_1 R_1^2 + E_2(R_2^2 - R_1^2) + E_3(R_3^2 - R_2^2)}{R_3^2} \quad (4)$$

$$E_c = \frac{E_1 R_1^2 + E_2(R_2^2 - R_1^2)}{R_2^2} \quad (5)$$

Now, let us obtain the air-tightness conditions which do not permit any leakage between the respective layers without regard to the adherency therebetween.

(1) an air-tightness condition, which does not cause any leakage between the solder and the metal coating:

$$P_o < P_m \quad (6)$$

(2) an air-tightness condition, which does not cause any leakage between the metal coating and the primary coating:

$$P_o < P_c \quad (7)$$

(3) an air-tightness condition, which does not cause any leakage between the primary coating and the glass:

$$P_o < P_g \quad (8)$$

Expressions (6), (7) and (8) show that no leakage occurs between the respective layers when their internal stresses, rated by the external pressure $P_o$, assume values larger than 1.0.

Figure 5:
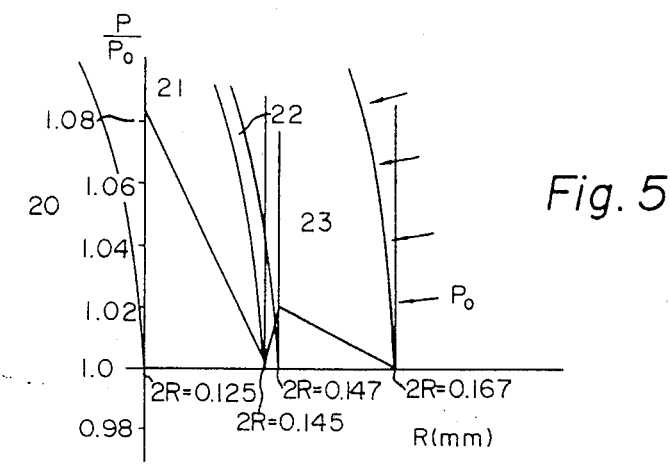
FIGS. 5, 6 and 7 are graphs showing calculation results explanatory of the principles of the present invention.

Table 1 shows the Young's moduli and Poisson's ratios of respective materials. FIG. 5 shows an example of the results of calculations based on the values given in the Table 1.

TABLE 1

| Material | E | $\nu$ |
|---|---|---|
| glass (quartz) | 7300 Kg/mm² | 0.17 |
| PVF₂ (primary coating) | 200 | 0.40 |

TABLE 1-continued

| Material | E | ν |
| --- | --- | --- |
| polyamide (primary coating) | " | " |
| Cu | 12900 | 0.34 |
| solder | 3060 | 0.40 |

Figure 6:
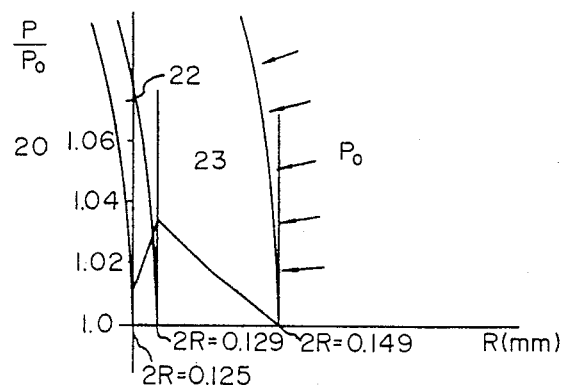
Figure 7:
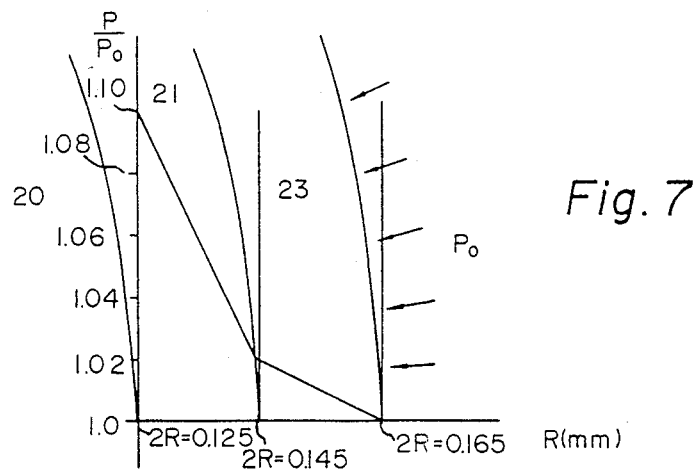

FIG. 5 indicates that in a case where a copper layer is coated at a thickness of 1 μm on the primary coating having a thickness of 10 μm, if the solder has a thickness of 10 μm, then the fiber is free from leakage between respective layers. It is seen, of course, that even if no primary coating is provided, any leakage can be prevented by a solder layer of a thickness of 10 μm around the copper layer coated by about 1 μm directly on the fiber as shown in FIG. 6. Further, it is understood that no leakage develops also when the primary coating 21 is covered directly with the solder layer 23 as shown in FIG. 7 contrary to the above.

When the primary coating and the metal coating are used, the thickness of the solder layer necessary for preventing any leakage somewhat varies according to their materials and thicknesses. In practice, however, the primary coating can easily be formed to a thickness of about 10 μm, by coating a resin of relatively large Young's modulus, such as $PVF_2$, polyimide or the like, and it has been found that even in a case of using silicon resin or the like of small Young's modulus, if its thickness is 25 μm, any leakage could be prevented with a 50 μm-thick solder layer; therefore, it is sufficient that the thickness of the solder layer is 100 μm. Moreover, in connection with the metal coating, in a case of forming it by evaporation or ion plating of copper, a thickness of 1 to 2 μm is practical and sufficient. In a case of using a metal (e.g. tin) of far smaller Young's modulus than copper, it has been found that even if it is coated up to a thickness ten times larger than in the case of copper, no leakage develops by a solder layer of a thickness of about 10 μm.

It will be seen that, as described above, in a case where the optical fiber is covered with a solder layer having a thickness of about 10 to 100 μm, regardless of whether the fiber is given with the primary coating and the metal coating, an optical fiber hermetic sealing structure can be provided which prevents any leakage by the self-sealing effect resulting from the internal stress, whatever external pressures may be applied from the outside of the solder layer.

The present invention provides, by the application of the above-described principles, an optical fiber hermetic fixture of the feedthrough which secures very stable air- and water-tightness characteristics and readily assures its reliability for a long time more than 20 years.

Figure 8A:
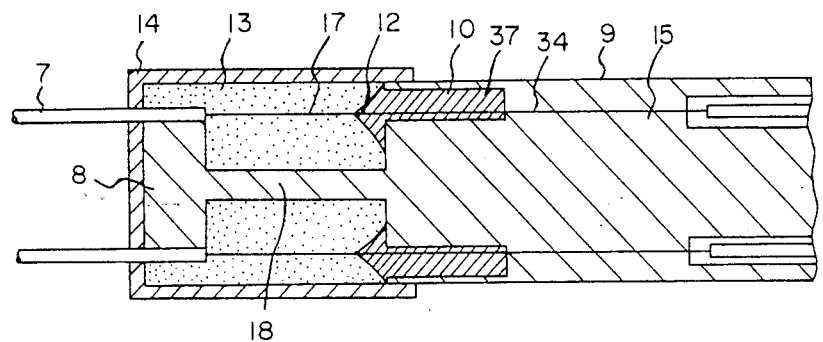
FIGS. 8A, 8B, 9, 10, 11, 12 and 13 are longitudinal sections illustrating embodiments of the present invention.

FIG. 8A illustrates an embodiment of the present invention. The optical fiber 7 has its portion 17 at which its coating is stripped. In this case, the fiber may be stripped up to its glass portion, may have the primary coating (about 10 to 20 μm) left unremoved, or may have a metal coating (Cu: about 1 to 2 μm, Sn: about 1 to 20 μm) given on the glass or the primary coating. The fiber 17 is introduced into and disposed in a fiber receiving through opening 34 defined between a fiber-supporting guide 15 and the metal sleeve 9 mounted thereon. The fiber receiving through hole 34 has at one end a groove 37 defined between the fiber-supporting guide 15 and the metal sleeve 9, and the groove 37 is filled with solder as indicated by reference 10. The fiber 17 is sealed by the solder at the solder sealing portion 10 and, in such a case, the solder is filled around each fiber in a manner to be swollen in a conical form from the solder sealing portion 10, as indicated by the conical swell 12 in FIG. 8B. For filling the solder in such a form, it is more advantageous that the fiber has the metal coating, and the uncovered portion 17 of the fiber may also be plated with solder in advance. It is also possible to swell the solder by slightly pulling up the fiber when the solder is sealed.

Figure 9:
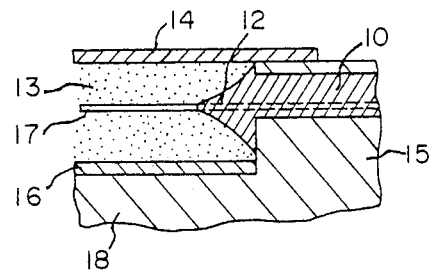
Figure 10:
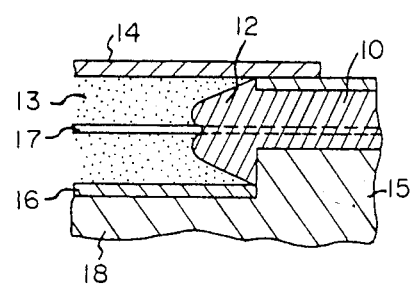

In order to avoid that the solder makes close contact with the fiber support post 18 and is not filled in the conical form around the fiber, the support post 18 is given a Teflon (Trademark) coating 16 as shown in FIG. 9, by which the solder can be filled around the fiber in the swollen form. When the fiber has no metal coating, it is difficult to swell the solder but, in such a case, by applying any suitable surface treating, such as the Teflon coating 16 on the support post 18 for preventing from adhering thereto, the solder can be swollen as depicted in FIG. 10. In this case, the solder is slightly concave at a boundary between it and the fiber as shown and, further, although the form of the swollen solder is not conical but bell-shaped, it does not matter.

The solder is filled around each fiber in such a swollen form as described above, and a liquid filler 13 is filled to ensure that a pressure, is applied, may be exerted uniformly around the solder. As the filler 13, polyisobutylene, grease, jelly or the like is used. Reference numeral 14 indicates a cap for preventing an outflow of the filler 13.

With such an arrangement as described above, it is possible to obtain an optical hermetic fixture structure which inhibits the leakage thereinto of sea water and water vapor by virtue of the self-sealing effect resulting from the compression of the solder even if sea water pressure is applied to the feedthrough in case of a cable fault. Further, this structure dues not permit any leakage so long as the solder layer exists around the fiber, and it does not rely at all on a stress by thermal shrinkage of the solder and its adherency, so that a very high reliability feedthrough can be obtained.

Moreover, owing to the self-sealing effect, a thrust which is exerted on the fiber when a pressure is applied can be received by this portion. Let an external pressure on the fiber be represented by P and the diameter of the fiber by d, a thrust $F_1$ applied to the fiber is as follows:

$$F_1 = \frac{\pi d^2}{4} \cdot P \tag{9}$$

Figure 8B:
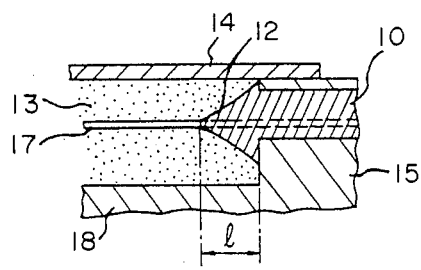

Let the length of the swell of the solder be represented by l (FIG. 8B). The compressive stress P′ to which the fiber is exposed in the section l is $P < P' \leq 1.1P$ from FIGS. 4A to 6, but suppose P′=P, estimated at a minimum. In this case, the frictional force $F_2$ which the fiber receives in the section l is as follows:

$$F_2 = \pi d \mu P' l \tag{10}$$

wherein μ is a coefficient of friction between the fiber and the solder. From expressions (9) and (10), it follows that $$F_2 - F_1 = \pi dP\left(\mu l - \frac{d}{4}\right) \quad (11)$$

If $F_2-F_1>0$, then the fiber is retained in the section 1. From expression (11), $$l \geq \frac{d}{4\mu} \quad (12)$$

In this case, estimating the coefficient of friction $\mu$ small, e.g. about 0.1 ($\mu=0.1$ to 0.2 in a case where lubricating oil is applied between metal surfaces), $l \geq 0.31$ to 0.32 ($d=0.125$ to $0.135$ mm) from expression (12). Accordingly, it will be seen that when the solder swells at length of about 0.5 mm, not only air-tightness but also an effect of retaining the fiber can be obtained.

In FIG. 8A, reference numerals 9 and 15 indicate a solder sealing and a fiber-supporting guide, respectively. They may preferably be made of a metal of a small thermal expansion coefficient and a high Young's modulus, for example, Kovar or the like, so as to reduce any temperature distortion of the optical fiber hermetic fixing portion and its stress distortion by a pressure, thereby preventing an increase in the loss of the fiber and improving its mechanical reliability against its breakage or the like. Furthermore, for reducing the distortions under any heat and pressure, it is necessary to dispose the optical fiber in the solder sealing portion 10 as close to the fiber-supporting guide 15 as possible so that the fiber, the solder and the fiber-supporting guide may move as one body. In addition, for decreasing the heat distortion of the fiber support 8, 18, it is necessary that the cap 14 for preventing any leakage of the liquid filler 13 be made of Kovar or the like of a small thermal expansion coefficient, or made of Teflon of the like plastics material and be not fixed to the sleeve 9 but merely engaged thereto is such a manner as not to transmit a heat distortion of the Teflon to the fiber.

Figure 11:
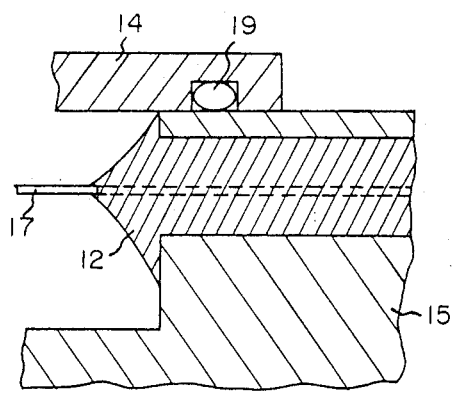

Besides, even if the cap 14 is made of a metal of a large thermal expansion coefficient, its heat distortion can be prevented from being transmitted to the fiber by movably sealing the cap 14 through using an "O" ring 19 as shown in FIG. 11.

Figure 12:
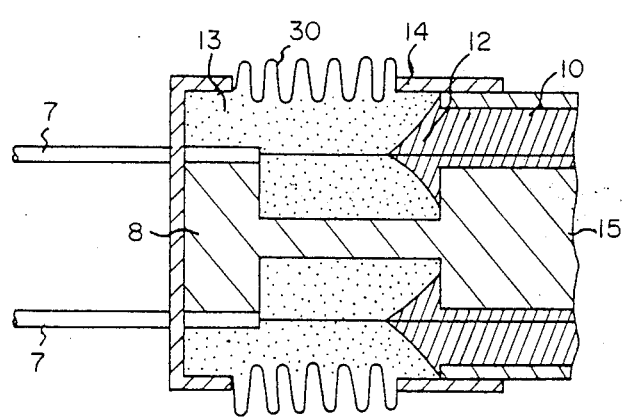

It is also possible to adopt such a structure as shown in FIG. 12 in which the cap 14 is formed by a bellows 30 to absorb the heat distortion of the cap 14.

Figure 13:
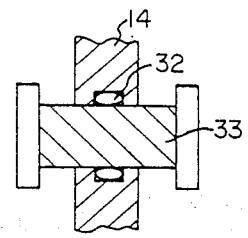

In the case of using such a cap as described above, it is necessary to transmit an external pressure in case of a trouble to the internal liquid filler 13. When the cap is made of a plastic material or formed by the bellows, the pressure is transmitted to the inside but, when the cap is made of metal, the pressure transmission can be achieved, for instance, by fixing a moving type piston cap 33 somewhere on the cap 14 with an "O" ring 32 as shown in FIG. 13.

As has been described in detail in the foregoing, according to the present invention, such as optical hermetic fixture structure is formed in which solder is provided in a swelled state around an optical fiber glass, a thin primary coating or a metal coating thereon to form a solder layer so that a pressure is applied uniformly from the outside of the solder layer to the inside thereof. A fiber-supporting guide, a sleeve, a fiber support and a cap are each formed of a metal of a small thermal expansion coefficent (for example, Kovar), or the cap is made of plastics or rubber, thereby preventing its distortion from being transmitted to the fiber. The fiber positioned at a solder sealing part is disposed as close to the fiber-supporting guide as possible and is sealed. With such a structure, it is possible to obtain a high-reliability feedthrough which provides water- and air-tightness of high stability even if a trouble occurs at anytime during the life time of the system, and which has very little thermal and stress distortions. Incidentally, it is a matter of course that the use of an adhesive binder instead of the solder produces exactly the same effect.

What we claim is:

1. In an optical fiber hermetic fixing structure of a feedthrough for an optical submarine repeater having a housing comprising a metal cylindrical fiber-supporting guide and a metal sealing sleeve circumferentially surrounding said fiber-supporting guide to define therebetween at least one through opening through which an optical fiber is introduced into said housing of said optical submarine repeater and, on the sea-water side of said through opening, a groove of larger cross sectional area than said through opening, a protective cover cap mounted coaxially on the sea-water end of said metal sealing sleeve to define a space at the sea-water ends of said fiber-supporting guide and said metal sealing sleeve, said cover cap having at least one exit opening for said optical fiber, and a low melting temperature metal filling said groove, the improvement that said low melting temperature metal extends outwardly of said groove into said space in the form of a bulge portion of generally conical form and said space is filled with liquid filler means which exerts pressure on said bulge portion of said low melting temperature metal to effect a seal of said optical fiber.

2. An optical fiber hermetic fixing structure according to claim 18, in which said fiber-supporting guide has a fiber support post portion of reduced cross sectional area extending into said space and a cylindrical fiber support portion at an outer end of said post portion and inside said cover cap for supporting said fiber.

3. An optical fiber hermetic fixing structure according to claim 2, in which said support post portion is sheathed with a heat-resistant plastic layer.

4. An optical fiber hermetic fixing structure according to claim 3, in which said plastic layer is a layer of Teflon.

5. An optical fiber hermetic fixing structure according to claim 1, in which said fiber-supporting guide and said sealing sleeve are of a metal having a low coefficient of thermal expansion.

6. An optical fiber hermetic fixing structure according to claim 5, in which said metal having a low coefficient of thermal expansion is Kovar.

7. An optical fiber hermetic fixing structure according to claim 1, in which said protective cover cap is compressible relative to said fiber-supporting guide and metal sealing sleeve whereby sea water applies pressure to said liquid in said space and through said liquid applies pressure to said bulge portion of said low melting temperature metal.

8. An optical fiber heremetic fixing structure according to claim 7, in which said cover cap is movable axially relative to said metal sealing sleeve and in which sealing means is provided between said cover cap and said metal sealing sleeve.

9. An optical fiber hermetic fixing structure according to claim 8 in which said sealing means comprises an O-ring disposed circumferentially between said metal sealing sleeve and said cover cap and allowing relative movement between said sleeve and said cover cap.

10. An optical fiber hermetic fixing structure according to claim 7, in which said protective cover cap comprises a skirt portion with an intermediate bellows section permitting said cover cap to expand and contract axially.

11. An optical fiber hermetic fixing structure according to claim 1, in which said bulge portion of said low temperature melting temperature metal is concave at the apex thereof.

12. An optical fiber hermetic fixing structure according to claim 1 in which said liquid filling said space is selected from the group consisting of polyisobutylene, grease and jelly.

13. An optical fiber hermetic fixing structure according to claim 1, in which said optical fiber is stripped and has a copper coating where stripped in sealing contact with said low melting temperature metal.

14. An optical fiber hermetic fixing structure according to claim 1, in which a portion of said fiber in said groove has a metal coating and is plated with solder before said low melting temperature metal is introduced into said groove.

15. An optical fiber hermetic fixing structure according to claim 1, in which said protective cover cap is formed of flexible plastic material.

16. An optical fiber hermetic fixing structure according to claim 1, in which a plurality of said through openings are distributed circumferentially around said cylindrical fiber supporting guide.

* * * * *